US010835854B2

United States Patent
Münster-Swendsen et al.

(10) Patent No.: US 10,835,854 B2
(45) Date of Patent: Nov. 17, 2020

(54) PROCESS FOR LOW TEMPERATURE GAS CLEANING WITH OZONE AND A CATALYTIC BAG FILTER FOR USE IN THE PROCESS

(71) Applicant: Haldor Topsøe A/S, Kgs. Lyngby (DK)

(72) Inventors: Janus Emil Münster-Swendsen, Espergærde (DK); Niklas Bengt Jakobsson, Kågeröd (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/331,447

(22) PCT Filed: Sep. 11, 2017

(86) PCT No.: PCT/EP2017/072728
§ 371 (c)(1),
(2) Date: Mar. 7, 2019

(87) PCT Pub. No.: WO2018/065175
PCT Pub. Date: Apr. 12, 2018

(65) Prior Publication Data
US 2019/0217240 A1    Jul. 18, 2019

(30) Foreign Application Priority Data
Oct. 7, 2016   (DK) .................... 2016 00603

(51) Int. Cl.
| | | |
|---|---|---|
| B01D 53/00 | (2006.01) | |
| B01D 46/00 | (2006.01) | |
| B01D 46/02 | (2006.01) | |
| B01D 53/44 | (2006.01) | |
| B01D 53/86 | (2006.01) | |
| B01D 53/76 | (2006.01) | |
| B01J 21/06 | (2006.01) | |
| B01J 23/22 | (2006.01) | |
| B01J 23/648 | (2006.01) | |
| B01J 35/06 | (2006.01) | |

(52) U.S. Cl.
CPC ....... *B01D 53/007* (2013.01); *B01D 46/0027* (2013.01); *B01D 46/02* (2013.01); *B01D 53/44* (2013.01); *B01D 53/76* (2013.01); *B01D 53/869* (2013.01); *B01D 53/8675* (2013.01); *B01D 53/8687* (2013.01); *B01J 21/063* (2013.01); *B01J 23/22* (2013.01); *B01J 23/6482* (2013.01); *B01J 35/06* (2013.01); *B01D 2251/104* (2013.01); *B01D 2255/1021* (2013.01); *B01D 2255/1023* (2013.01); *B01D 2255/20707* (2013.01); *B01D 2255/20723* (2013.01); *B01D 2255/20776* (2013.01); *B01D 2257/304* (2013.01); *B01D 2257/306* (2013.01); *B01D 2257/708* (2013.01); *B01D 2258/06* (2013.01); *B01D 2259/804* (2013.01); *B01D 2275/10* (2013.01)

(58) Field of Classification Search
None
See application file for complete search history.

(56) References Cited

U.S. PATENT DOCUMENTS

| | | | |
|---|---|---|---|
| 6,733,570 | B2 | 5/2004 | Fujii et al. |
| 2002/0170815 | A1 | 11/2002 | Fujii |
| 2006/0084571 | A1 | 4/2006 | Michalakos et al. |
| 2010/0254868 | A1 | 10/2010 | Obee et al. |
| 2011/0033346 | A1* | 2/2011 | Bohlen .................. A61L 9/205 422/186.3 |
| 2011/0171094 | A1 | 7/2011 | Zahedi |
| 2012/0114540 | A1 | 5/2012 | Chin et al. |
| 2014/0065047 | A1 | 3/2014 | Hui et al. |
| 2015/0118138 | A1 | 4/2015 | Jung et al. |
| 2016/0045866 | A1* | 2/2016 | Wang ...................... B01J 20/20 422/180 |

FOREIGN PATENT DOCUMENTS

| | | |
|---|---|---|
| CN | 101784327 A | 7/2010 |
| EP | 2 119 974 A1 | 11/2009 |
| KR | 10-2008-0039643 A | 5/2008 |

(Continued)

OTHER PUBLICATIONS

K-P. Yu et al., "Decomposition of Gas-Phase Toluene by the Combination of Ozone and Photocatalytic Oxidation Process ($TiO_2$/UV, $TiO_2$/UV/$O_3$, and UV/$O_3$)", Applied Catalysis B: Environmental, vol. 75, pp. 29-38, 2007.

R.M. Alberici et al., "Gas-Phase Destruction of VOCs Using $TiO_2$/UV and $TiO_2$/$O_3$/UV", J. Adv. Oxid. Technol., vol. 3, No. 2, pp. 182-187, 1998.

H.Huang et al., "Efficient Degradation of Gaseous Benzene by VUV Photolysis Combined with Ozone-Assisted Catalytic Oxidation: Performance and Mechanism", Applied Catalysis B: Environmental, vol. 186, pp. 62-68, 2016.

(Continued)

*Primary Examiner* — Anita Nassiri-Motlagh
(74) *Attorney, Agent, or Firm* — Blank Rome LLP

(57) ABSTRACT

A process for the cleaning of a lean gas stream contaminated with volatile organic compounds (VOCs) and/or sulfur-containing compounds comprises the steps of adding ozone to the contaminated lean gas stream, subjecting the ozone-containing lean gas stream to ultraviolet irradiation, thereby transforming VOCs to particles, maintaining the irradiated gas stream in a stay zone for a sufficient time to allow aerosol particle growth, and passing the gas stream through a catalytic bag filter at a temperature down to room temperature to remove the formed particles and eliminate any remaining ozone. The bag filter has been made catalytic by impregnation with one or more metal oxides in which the metals are selected from V, W, Pd and Pt, supported on $TiO_2$.

12 Claims, No Drawings

(56) References Cited

FOREIGN PATENT DOCUMENTS

| WO | WO 07/124865 A1 | 11/2007 |
| WO | WO 2009/002294 A1 | 12/2008 |
| WO | WO 2014/124830 A1 | 8/2014 |
| WO | WO 2015/014305 A1 | 2/2015 |
| WO | WO 2016/030207 A1 | 3/2016 |
| WO | WO 2016/058713 A1 | 4/2016 |

OTHER PUBLICATIONS

H. Huang et al., "VUV Photo-Oxidation of Gaseous Benzene Combined with Ozone-Assisted Catalytic Oxidation: Effect on Transition Metal Catalyst", Applied Surface Science, vol. 391, pp. 662-667, 2017.

K.C. Soni et al., "Catalytic Activity of Fe/$Zro_2$ Nanoparticles for Dimethyl Sulfide Oxidation", Journal of Colloid and Interface Science, vol. 446, pp. 226-236, 2015.

P. Konova et al., "Catalytic Oxidation of VOCs and CO by Ozone Over Alumina Supported Cobalt Oxide", Applied Catalysis A: General, vol. 298, pp. 109-114, 2006.

* cited by examiner

PROCESS FOR LOW TEMPERATURE GAS CLEANING WITH OZONE AND A CATALYTIC BAG FILTER FOR USE IN THE PROCESS

The present invention relates to a process for low temperature cleaning of lean gases with ozone and a catalytic bag filter for use in the process. More specifically, the process according to the invention consists in adding ozone to a lean gas stream, which is contaminated by volatile organic compounds (VOCs) and/or sulfur-containing compounds such as $H_2S$ or dimethyl sulfide, and subjecting the thus treated lean gas stream to radiation with ultraviolet (UV) light. Then the radiated gas stream is maintained in a stay zone for a sufficient time to allow an aerosol particle growth after the UV treatment. The formed particles are subsequently removed in a catalytic bag filter.

Previously, lean gas streams have just been emitted to the surroundings without any cleaning. However, with regulations becoming increasingly stringent, it is necessary to impose some action on such gas streams. Today, regenerative thermal oxidizers (RTOs) or scrubbers are typically used.

Catalytic processes are used for the removal of harmful components from waste gases. In this connection it is important to reduce the temperature of the catalytic reactions with a view to saving energy and at the same time keeping a high catalytic activity. Therefore, research and investigations are aimed at finding effective low temperature catalysts or new catalytic processes. An appropriate process in this respect is ozone catalytic oxidation (OZCO method), which uses ozone as an oxidant in catalytic oxidation reactions.

Ozone (trioxygen, $O_3$) is known as a strong oxidizing agent for waste and drinking water treatment, sterilization and deodoration. It is an allotrope of oxygen that is much less stable than the diatomic allotrope $O_2$, breaking down in the lower atmosphere to normal dioxygen. As mentioned, ozone is a powerful oxidant (far more so than dioxygen), and so it has many industrial applications related to oxidation. Because of the considerable oxidizing power of ozone and the formation of molecular oxygen as a by-product, ozone is sometimes chosen for oxidation. In fact, oxidation using ozone offers at least the following advantages over chemical alternatives:

ozone can be generated on-site,
ozone rapidly decomposes to oxygen, leaving no traces,
reactions do not produce toxic halogenated compounds, and
ozone acts more rapidly and more completely than other common oxidizing agents.

However, due to the fact that ozone itself is toxic, the residual ozone from these oxidation processes must be removed. Moreover, being quite harmful to animal and plant tissue even in concentrations as low as around 100 ppb, ozone is a pollutant that cannot be emitted. For these reasons, much research is devoted to find suitable catalysts for oxidation reactions using ozone and also to find effective ways of removing residual ozone following such oxidation reactions.

It has now surprisingly been found that a catalytic bag filter, which is impregnated with vanadium, tungsten, palladium or platinum, can markedly reduce the content of volatile organic compounds (VOCs) and/or sulfur-containing compounds such as $H_2S$ or dimethyl sulfide in a lean gas stream, to which ozone has been added, at low temperatures.

Even more surprisingly it has further been found that this catalyst not only reduces the VOCs and/or sulfur contents in the gas stream, but also removes any residual ozone.

*Journal of Colloid and Interface Science* 446, 226-236 (2015) relates to investigations of the vapor phase catalytic oxidation of dimethyl sulfide (DMS) with ozone over nano-sized $Fe_2O_3$—$ZrO_2$ catalysts carried out at low temperatures, i.e. 50-200° C. The catalysts are different from those used in the process of the invention, and a possible removal of VOCs is not mentioned.

The catalytic oxidation of VOCs and CO by ozone over an alumina-supported cobalt oxide catalyst system with over-stoichiometric oxygen ($CoO_x/Al_2O_3$) with heterogeneous catalytic decomposition of ozone is described in *Applied Catalysis A: General* 298, 109-114 (2008). Again the catalysts are different from those used in the process of the invention, and a possible removal of sulfur compounds is not mentioned.

*Applied Catalysis B: Environmental* 75, 29-38 (2007) deals with the decomposition of gas-phase toluene by the combination of ozone and a photocatalytic oxidation process. The catalyst used is coated onto a glass plate, whereas the catalyst used in the present invention is impregnated into a bag filter. The results mentioned in this prior art citation are not unequivocal.

US 2006/0084571 A1 discloses a low-temperature ozone catalyst which is a metal oxide. The specific purpose of the catalyst is to convert (i.e. destroy) ozone, particularly in airplane bleed air. This is done by an ozone destroying system consisting of a core and an active metal oxide washcoat applied to the core, which destroys ozone. The metal oxide comprises an oxide of Cu, Fe, Co, Ni or combinations thereof.

In US 2011/0171094 A1, an apparatus and a method for the removal of particles and VOCs from an air stream is described. In this method, particles carried by the air stream are charged by a corona ionizer and then collected by an electrically enhanced filter downstream the ionizer. A catalytic filter downstream of the electrically enhanced filter removes the VOCs as well as ozone generated by the ionizer.

US 2014/0065047 A1 describes treatment of gases by catalytic ozone oxidation. The ozone oxidation catalyst has a porous body formed from a metal body, from a ceramic or from polymeric fibers coated with metal. A catalytic noble metal composition, the noble metal being palladium, platinum or both, is deposited on the surface of the porous body, and the catalytic noble metal composition is formed from particles of a noble metal supported by a mesoporous molecular sieve. The gas treatment consists in adding ozone, passing the gas over a filter comprising the ozone oxidation catalyst and removing the VOCs.

Finally, a method and a device for cleaning air is known from EP 2 119 974 A1. The air to be cleaned is treated with ozone and possibly also water, ammonia or other aerosol growth promoters, subjected to UV light and maintained for a sufficient time to allow aerosol particle growth. Then the particles in the air are given an electrical charge and passed through an electrostatic filter, and finally the air flows over a catalyst to break down residual ozone. The catalyst can be any ozone removal catalyst known in the art.

The present invention relates to a novel process for the cleaning of a lean gas stream contaminated with volatile organic compounds (VOCs) and/or sulfur-containing compounds, said process comprising adding ozone to the contaminated lean gas stream,
subjecting the ozone-containing lean gas stream to ultraviolet irradiation, thereby transforming VOCs to particles,
maintaining the irradiated gas stream in a stay zone for a sufficient time to allow aerosol particle growth, and
passing the gas stream through a catalytic bag filter at a temperature down to room temperature to remove the formed particles and eliminate any remaining ozone,
wherein the bag filter has been made catalytic by impregnation with a catalyst substance.

Preferably the catalyst substance contains one or more of the metals vanadium, tungsten, palladium and platinum supported on $TiO_2$.

A catalytic bag filter consists of a substrate, a carrier and one or more catalytic materials. The substrate of the catalyst substance is a fiber structure having the form of woven glass fibers, and the carrier can be titanium dioxide or another suitable compound. The catalytic material can be vanadium, tungsten, palladium and platinum. The carrier ($TiO_2$) can itself be catalytically active in the process of the invention.

Bag filters are well suited for the removal of dust and particulate matter from gas streams. Catalytic bag filters have the double utility of being able both to remove particulates from a gas stream and to catalyze one or more desired reactions in the gas. A catalytic bag filter typically comprises two or three layers of filter fabric, each layer containing a tailored catalyst optimized for removal of a specific kind of compound from the gas that passes through it. Dust and other particulate matter will settle on the surface of the outer bag, from where it can easily be removed. The two or three-layer structure provides the flexibility to tailor different catalytic combinations for different purposes.

It is especially preferred to tailor different catalytic combinations for the individual layers of the bag filter, such that the inner layer of the catalytic bag filter contains a catalytic substance which is especially efficient in removing ozone, while the other layers contain catalytic substances which are more efficient for VOC removal. This is because the gas passes through the bag layers in the direction from the outside to the inside and the last step of the cleaning process is the ozone removal.

In the process of the invention, ozone is added to the lean gas stream. Any source of ozone can, in principle, be used in the ozone treatment step, and some ozone is generated during the UV light treatment of the gas in the subsequent process step.

From the ozone addition step, the gas stream proceeds to a step of UV irradiation treatment. Depending on the apparatus design, these two steps can be made into one.

Broad-spectrum UV light with a wavelength between 100 and 330 nm initially breaks down the ozone into oxygen ($O_2$) and an oxygen radical ($O^*$), but the main feature of the UV irradiation in the context of the invention is that any VOC present in the gas stream is transformed to particles by the UV light.

The irradiated gas stream is then maintained in a stay zone for a sufficient time to allow particles of transformed VOC to grow.

Finally, the gas stream is passed through a catalytic bag filter to remove the particles formed and eliminate any remaining ozone. This is done at a temperature down to room temperature, more specifically at a temperature between 20 and 200° C., preferably lower than 50° C.

The catalyst substance used in the process according to the invention consists of a substrate and a carrier impregnated with one or more metal oxides, in which the metals are selected from vanadium, tungsten, palladium and platinum.

The catalyst carrier is preferably titanium dioxide, and the preferred metal oxide is vanadium oxide.

In addition to removing VOCs and/or sulfur-containing compounds down to very low residual levels, the process of the invention has the important characteristic feature that the specific catalyst used in the process is able to remove any residual ozone. This is very important because, as already mentioned, ozone is very toxic, and therefore any residual ozone from the gas cleaning process has to be thoroughly removed.

Ozone removal catalysts that have so far been used in various embodiments include $MgO_2$ or aluminum catalysts, carbon-supported metal oxides, carbon fibers coated with copper chloride, carbon-iron aerosol particles, Carulite™ and metal catalysts.

The invention claimed is:

1. A process for the cleaning of a gas stream contaminated with volatile organic compounds (VOCs) and/or sulfur-containing compounds, said process comprising
adding ozone to the contaminated gas stream prior to subjecting to ultraviolet irradiation,
subjecting the ozone-containing gas stream to ultraviolet irradiation, thereby transforming VOCs to particles,
maintaining the irradiated gas stream in a stay zone for a sufficient time to allow aerosol particle growth, and
passing the gas stream through a catalytic bag filter to remove the formed particles and eliminate any remaining ozone,
wherein the bag filter has been made catalytic by impregnation with a catalyst substance, wherein the catalytic bag filter comprises two or three layers of filter fabric impregnated with the catalyst substance, and wherein the two or three layers are configured such that a layer for ozone removal is the last layer the gas stream passes through before exiting the bag filter.

2. Process according to claim 1, wherein the catalyst substance contains one or more metal oxides, in which the metals are selected from vanadium, tungsten, palladium and platinum, supported on $TiO_2$.

3. Process according to claim 1, wherein the catalyst substance contains vanadium supported on $TiO_2$.

4. Process according to claim 1, wherein the catalyst substance contains vanadium and palladium supported on $TiO_2$.

5. Process according to claim 1, wherein the catalyst substance contains vanadium and platinum supported on $TiO_2$.

6. Process according to claim 1, wherein the two or three layers comprise an inner layer and one or two outer layers, and the one or two outer layers capture particulates formed in the stay zone.

7. Process according to claim 6, wherein the inner layer of the catalytic bag filter contains a catalytic substance which is especially efficient in removing ozone, while the one or two outer layers contain catalytic substances which are more efficient for VOC removal.

8. Process according to claim 1, wherein the gas stream is at a temperature between 20 and 200° C. when it is passed through the catalytic bag filter.

9. Process according to claim 6, wherein the gas stream is at a temperature lower than 50° C. when it is passed through the catalytic bag filter.

10. Process according to claim 1, wherein ozone is generated when the ozone-containing gas stream is subjected to ultraviolet irradiation, thereby transforming VOCs to particles.

11. Process according to claim 7, wherein the gas stream passes through the catalytic bag filter first through the one or two outer layers and then through the inner layer.

12. A process for the cleaning of a gas stream contaminated with volatile organic compounds (VOCs) and/or sulfur-containing compounds, said process comprising adding ozone to the contaminated gas stream and subjecting the ozone-containing gas stream to ultraviolet irradiation, thereby transforming VOCs to particles, maintaining the irradiated gas stream in a stay zone for a sufficient time to allow aerosol particle growth, and passing the gas stream through a catalytic bag filter to remove the formed particles and eliminate any remaining ozone, wherein the bag filter has been made catalytic by impregnation with a catalyst substance, wherein the catalytic bag filter comprises two or three layers of filter fabric impregnated with the catalyst substance, wherein the two or three layers are configured such that a layer for ozone removal is the last layer the gas stream passes through before exiting the bag filter, and wherein adding ozone to the contaminated gas stream and subjecting the ozone-containing gas stream to ultraviolet irradiation occur in a same step of the process.

\* \* \* \* \*